United States Patent
Inoue

(10) Patent No.: US 8,743,427 B2
(45) Date of Patent: Jun. 3, 2014

(54) IMAGE PROCESSING APPARATUS, INFORMATION PROCESSING APPARATUS, AND STORAGE MEDIUM

(75) Inventor: Katsuhiro Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 12/606,385

(22) Filed: Oct. 27, 2009

(65) Prior Publication Data

US 2010/0110500 A1 May 6, 2010

(30) Foreign Application Priority Data

Oct. 31, 2008 (JP) .................................. 2008-281869

(51) Int. Cl.
H04N 1/32 (2006.01)
H04N 1/00 (2006.01)

(52) U.S. Cl.
CPC ................................ H04N 1/00204 (2013.01)
USPC .......................................... 358/468; 358/400

(58) Field of Classification Search
USPC .................. 358/400, 468, 404, 444, 1.9, 1.15
See application file for complete search history.

(56) References Cited

U.S. PATENT DOCUMENTS

| 2002/0174141 | A1* | 11/2002 | Chen | 707/503 |
| 2007/0024872 | A1 | 2/2007 | Salgado | |
| 2007/0024901 | A1 | 2/2007 | Kayama | |
| 2009/0296150 | A1* | 12/2009 | Shudo | 358/1.15 |

FOREIGN PATENT DOCUMENTS

| JP | 2004-252505 A | 9/2004 |
| JP | 2008-047069 A | 2/2008 |
| KR | 10-2004-0013561 A | 2/2004 |

* cited by examiner

Primary Examiner — Jerome Grant, II
(74) Attorney, Agent, or Firm — Canon U.S.A., Inc. IP Division

(57) ABSTRACT

An image processing apparatus includes a receiving unit configured to receive a job ticket from an information processing apparatus, a determination unit configured to determine whether it is permitted for a user to use an extended function not included in functions described in function information defined in the job ticket received by the receiving unit, and a control unit configured, if it is determined by the determination unit that it is permitted for the user to use the extended function, to permit execution of processing on image data that uses a function described in the function information defined in the job ticket received by the receiving unit and execution of processing that uses the extended function.

4 Claims, 19 Drawing Sheets

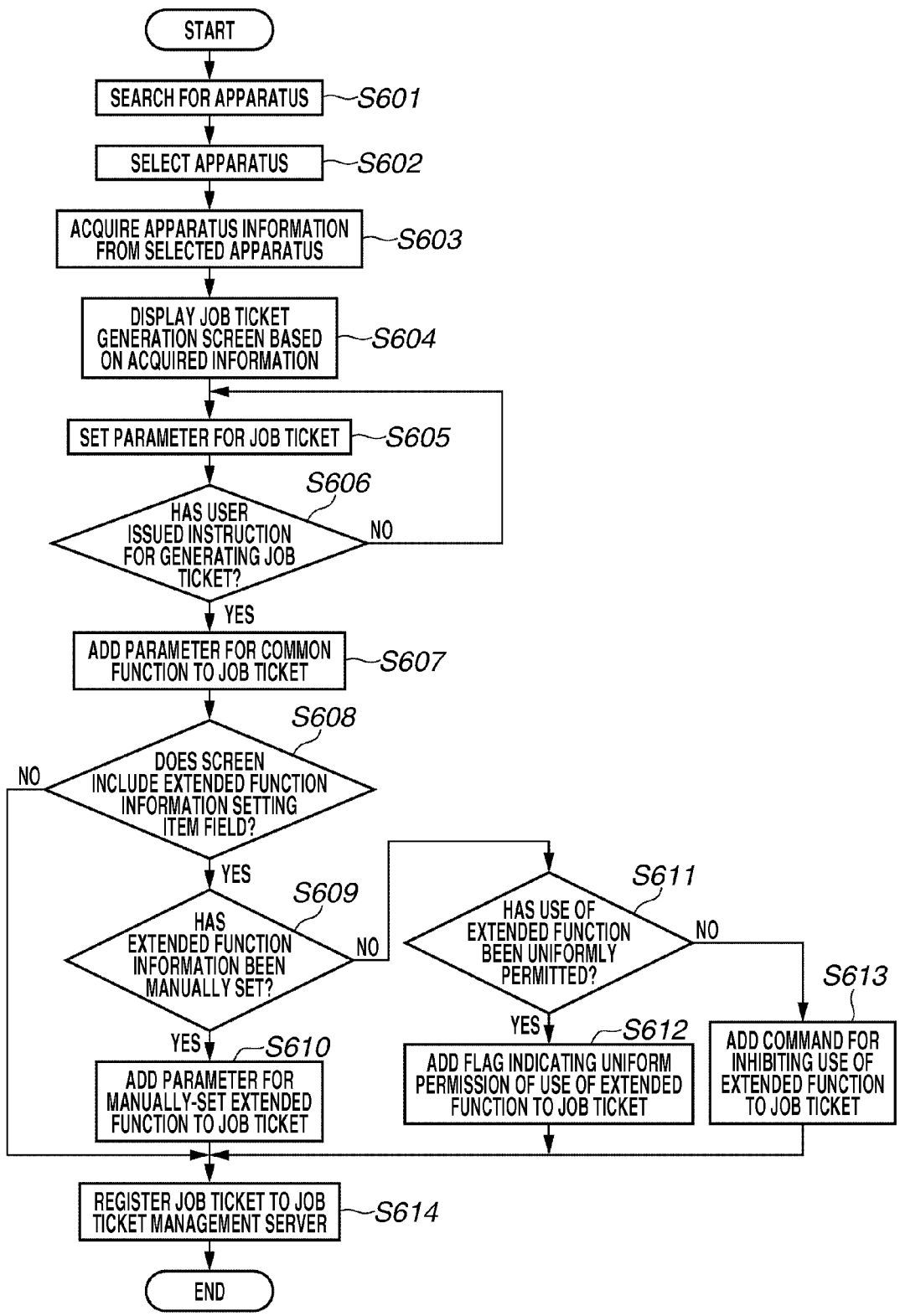

FIG.8

■ COMMON FUNCTION INFORMATION

| FUNCTION INFORMATION | PARAMETER | | PERMISSION FOR CHANGING PARAMETER ON APPARATUS |
|---|---|---|---|
| IMAGE FORMAT | ☑ JPEG<br>☐ RAW<br>☐ TIFF<br>☐ BMP | | ☑ |
| READING RESOLUTION | X DIRECTION | ☐ 100<br>☐ 200<br>☐ 300<br>☐ 400<br>☑ 600<br>☐ 1200 | ☐ |
| | Y DIRECTION | ☐ 100<br>☐ 200<br>☐ 300<br>☐ 400<br>☑ 600<br>☐ 1200 | ☐ |
| DATA TRANSMISSION METHOD | ☑ E-mail<br>☐ FTP<br>☐ FAX | | |
| DATA TRANSMISSION DESTINATION ADDRESS | xxx@yyyy.xxx | | |

■ EXTENDED FUNCTION INFORMATION

☑ MANUALLY SET EXTENDED FUNCTION INFORMATION
☐ UNIFORMLY PERMIT USE OF EXTENDED FUNCTION
☐ INHIBIT USE OF EXTENDED FUNCTION

| FUNCTION INFORMATION | PARAMETER | PERMISSION FOR CHANGING PARAMETER ON APPARATUS |
|---|---|---|
| COLOR DATA READING MODE | ☑ B/W<br>☐ RGB24 | ☐ |
| SCALING | ● ON<br>○ OFF | ☐ |
| ADF | ● ON<br>○ OFF | ☐ |
| ENCRYPTED PDF | ● ON<br>○ OFF | ☑ |
| OCR | ● ON<br>○ OFF | ☑ |
| SIGNED PDF | ○ ON<br>● OFF | ☐ |

| GENERATE JOB TICKET |
|---|

FIG.13

FUNCTION PARAMETER

| IMAGE FORMAT | JPEG | | ADF | ON | — 1201 |
| READING RESOLUTION X | 600 | | ENCRYPTED PDF | OFF | — 1202 |
| READING RESOLUTION Y | 600 | | OCR | OFF | |
| COLOR DATA READING MODE | B/W | | SIGNED PDF | OFF | |
| SCALING | USE | 1203 | | | |
| TRANSMISSION DESTINATION | xxx@yyyyy.co.jp | | | | |

SET  1204
CANCEL  1205

FIG.16

JOB TICKET

```
<?xml version="1.0" encoding="UTF-8" ?>
2001 — <Process id="0001" creator="192.168.0.101" caption="TICKET 1">
    <Scan>
2002 —     <Setting type="format" changeable="1">
2003 —         JPEG
        </Setting>
        <Setting>···</Setting>
    </Scan>
    <Send type="email">
2004 —     <Setting type="address">
2005 —         xxx@yyyy.yyy
        </Setting>
        <Setting>···</Setting>
    </Send>
</Process>
```

FIG.17

JOB TICKET

```
<?xml version="1.0" encoding="UTF-8" ?>
2001 — <Process id="0001" creator="192.168.0.101" caption="TICKET 1">
    <Scan>
2002 —     <Setting type="format" changeable="1">
2003 —       JPEG
      </Setting>
      <Setting>···</Setting>
    </Scan>
    <Send type="email">
2004 —     <Setting type="address">
2005 —       xxx@yyyy.yyy
      </Setting>
      <Setting>···</Setting>
    </Send>
2006 — <extend>Encrypted PDF</extend>
    <extend>OCR</extend>
    <extend>Signature</extend>
</Process>
```

FIG.18

JOB TICKET

```
<?xml version="1.0" encoding="UTF-8" ?>
2001 — <Process id="0001" creator="192.168.0.101" caption="TICKET 1">
    <Scan>
2002 —     <Setting type="format" changeable="1">
2003 —         JPEG
        </Setting>
        <Setting>···</Setting>
    </Scan>
    <Send type="email">
2004 —     <Setting type="address">
2005 —         xxx@yyyy.yyy
        </Setting>
        <Setting>···</Setting>
    </Send>
2007 — <extend permission ="1">···</extend>
</Process>
```

FIG.19

JOB TICKET

```
<?xml version="1.0" encoding="UTF-8" ?>
2001 — <Process id="0001" creator="192.168.0.101" caption="TICKET 1">
         <Scan>
2002 —      <Setting type="format" changeable="1">
2003 —         JPEG
            </Setting>
            <Setting>…</Setting>
         </Scan>
         <Send type="email">
2004 —      <Setting type="address">
2005 —         xxx@yyyy.yyy
            </Setting>
            <Setting>…</Setting>
         </Send>
2008 —   <extend permission ="0">…</extend>
      </Process>
```

IMAGE PROCESSING APPARATUS, INFORMATION PROCESSING APPARATUS, AND STORAGE MEDIUM

BACKGROUND OF THE INVENTION

1. Field of the Invention

The present invention relates to an image processing apparatus, an information processing apparatus, and a storage medium.

2. Description of the Related Art

A conventional image processing apparatus, such as a scanner, a facsimile apparatus, or a multifunction peripheral (MFP) receives a previously generated job ticket and executes processing according to a parameter defined in the received job ticket.

By using the above-described job ticket, the administrator can previously set a parameter, which allows a user to use an image processing apparatus, in a job ticket and instruct the image processing apparatus to execute only the operation instructed in the job ticket.

In addition, a conventional information processing apparatus generates a job ticket that can be used regardless of a manufacturer and model of an image processing apparatus. The information processing apparatus like this uses a template which includes setting items related to basic configurations independent from a manufacturer, model type, and functions of the image processing apparatus and generates a job ticket according to settings set in the setting items included in the template. A job ticket generated in the above-described manner can be used on a wide spectrum of types of image processing apparatuses regardless of the manufacturer and model or type of the image processing apparatuses.

Meanwhile, in recent years, a conventional image processing apparatus includes high extended functions, such as a portable document format (PDF) encryption function for converting an image of a read document into an encrypted PDF file and an optical character recognition (OCR) function for recognizing characters (text) from an image of a document read by a scanner.

However, in a conventional method, in generating a job ticket according to a template, a parameter for an extended function, which is a function other than basic functions of an image processing apparatus such as a reading resolution setting function, cannot be set.

Accordingly, if an image processing apparatus receives a job ticket, a user cannot use an extended function, such as a PDF encryption function or a signed PDF file generation function on the image processing apparatus.

SUMMARY OF THE INVENTION

According to an aspect of the present invention, an image processing apparatus includes a receiving unit configured to receive a job ticket from an information processing apparatus, a determination unit configured to determine whether it is permitted for a user to use an extended function not included in functions described in function information defined in the job ticket received by the receiving unit, and a control unit configured, if it is determined by the determination unit that it is permitted for the user to use the extended function not included in the functions included in the function information defined in the job ticket received by the receiving unit, to permit execution of processing on image data that uses a function described in the function information defined in the job ticket received by the receiving unit and execution of processing that uses the extended function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 7 is a flow chart illustrating exemplary flow of control processing executed by the administrator PC according to an exemplary embodiment of the present invention.

FIG. 8 illustrates an example of a display screen displayed on the administrator PC according to an exemplary embodiment of the present invention.

FIG. 13 illustrates an example of a display screen displayed on the apparatus according to an exemplary embodiment of the present invention.

FIG. 16 illustrates an example of a job ticket according to an exemplary embodiment of the present invention.

FIG. 17 illustrates an example of a job ticket according to an exemplary embodiment of the present invention.

FIG. 18 illustrates an example of a job ticket according to an exemplary embodiment of the present invention.

FIG. 19 illustrates an example of a job ticket according to an exemplary embodiment of the present invention.

DESCRIPTION OF THE EMBODIMENTS

Various exemplary embodiments, features, and aspects of the invention will be described in detail below with reference to the drawings.

Figure 1:
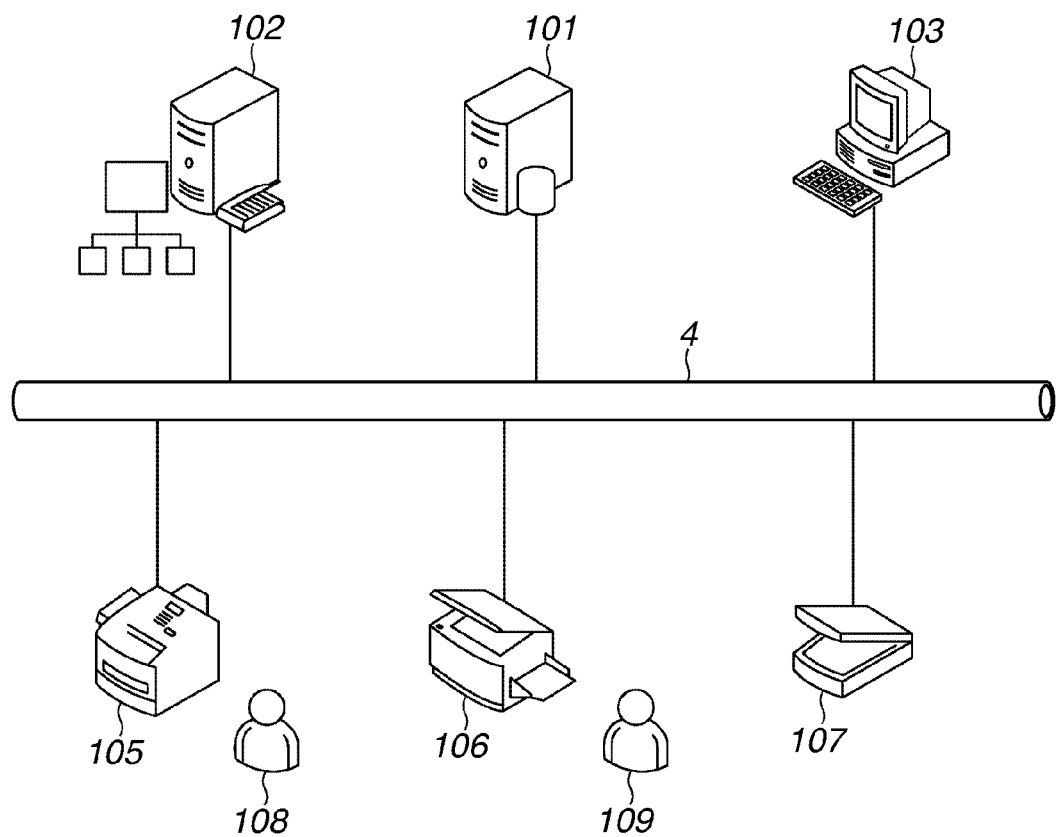
FIG. 1 illustrates an exemplary configuration of an image processing system according to an exemplary embodiment of the present invention.

A first exemplary embodiment of the present invention will now be described in detail below. FIG. 1 illustrates an exemplary configuration of a system according to an exemplary embodiment of the present invention. The image processing system according to the present exemplary embodiment includes a job ticket processing server 101, a job ticket management server 102, an administrator PC 103, and apparatuses 105 through 107, which are in communication with one another via a network 4.

Each of the apparatuses 105 through 107 includes a scanner. The apparatuses 105 through 107 use the scanner to read a document and transmits image data of the read document to other apparatuses or a terminal connected to the network 4. For the apparatuses 105 through 107, a single-function apparatus having a scanner function only or a multifunction peripheral (MFP) capable of executing a plurality of functions such as a scan function, a printing function, and a facsimile transmission function can be used.

The administrator PC 103 generates or edits a job ticket, which includes a content of processing executed by the job ticket processing server 101, the apparatus 105, the apparatus 106, or the apparatus 107.

In the present exemplary embodiment, a "job ticket" includes designations of the reading resolution for reading image data, an image reading size, a color reading mode (color/monochromatic), and a luminance adjustment value and the content of processing to be executed after reading an image (transmission of the read image by e-mail or OCR processing).

The job ticket management server 102 associates the job ticket generated by the administrator PC 103 with user information and stores and manages the job ticket and the associated user information. The job ticket management server 102 acquires a job ticket from the apparatus 105, the apparatus 106, the apparatus 107, or the job ticket processing server 101, which execute the processing described in the job ticket. A directory service (e.g., an active directory) capable of storing and acquiring a job ticket can be used as the job ticket management server 102.

The job ticket processing server 101 executes a series of postprocessing described in the job ticket on the image data transmitted from the apparatus 105, the apparatus 106, or the apparatus 107. In the present exemplary embodiment, the postprocessing includes processing for transmitting image data to a file server according to the setting included in the job ticket. In addition, the postprocessing includes processing for transmitting image data to an e-mail server by e-mail.

Users 108 and 109 are users who actually operate the apparatus 105, the apparatus 106, or the apparatus 107.

Figure 2:
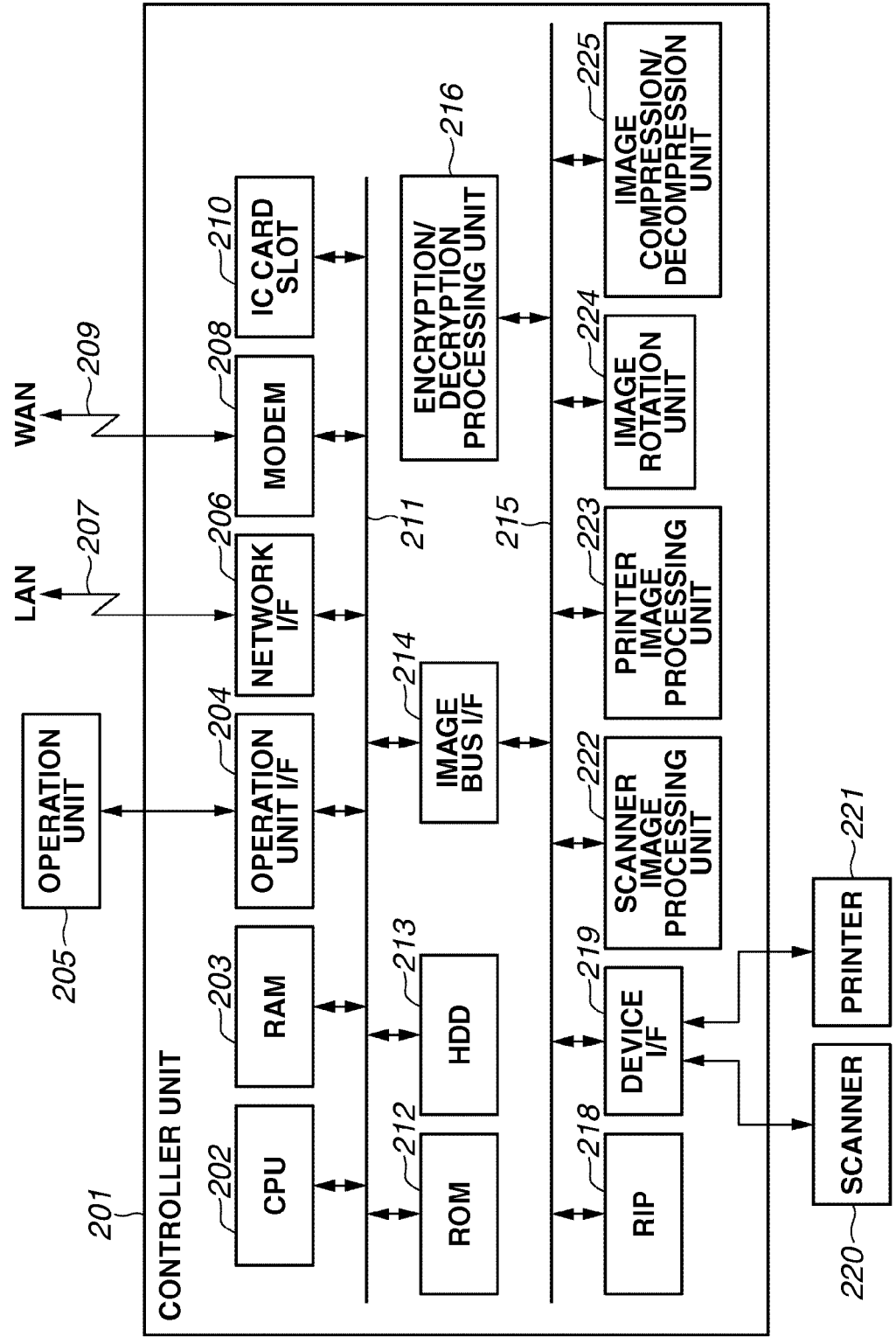
FIG. 2 illustrates an exemplary configuration of an apparatus according to an exemplary embodiment of the present invention.

FIG. 2 is a block diagram illustrating an exemplary configuration of each of the apparatuses 105 through 107, which are examples of image processing apparatus according to the present exemplary embodiment.

Referring to FIG. 2, the apparatus 105 includes a control unit 201, an operation unit 205, a scanner 220, and a printer 221.

The control unit 201 includes a central processing unit (CPU) 202, a random access memory (RAM) 203, an operation unit interface (I/F) 204, a network I/F 206, a modem 208, an integrated circuit (IC) card slot 210, a read-only memory (ROM) 212, a hard disk drive (HDD) 213, and an image bus I/F 214, which are in communication with one another via a system bus 211.

In addition, the control unit 201 includes a raster image processor (RIP) 218, a device I/F 219, a scanner image processing unit 222, a printer image processing unit 223, an image rotation unit 224, an image compression/decompression unit 225, and an encryption/decryption processing unit 216, which are in communication with one another via the image bus 215. The image bus 215 includes a peripheral component interconnect (PCI) bus or Institute of Electrical and Electronic Engineers (IEEE) 1394.

The image bus I/F 214 is an interface between the system bus 211 and the image bus 215, which is a bus for transmitting image data at a high speed. Furthermore, the image bus I/F 214 is a bus bridge for converting the structure of data.

Moreover, the control unit 201 is in communication with the operation unit 205, the scanner 220, and the printer 221.

The CPU 202 controls the entire operation of the apparatus 105 according to a program stored on the ROM 212.

The RAM 203 functions as a system memory (work memory) used by the CPU 202 to execute operations according to the present exemplary embodiment. In addition, the RAM 203 functions as an image memory for temporarily storing image data during processing executed under control of the CPU 202.

The operation unit I/F 204 is an interface with the operation unit 205. The operation unit I/F 204 outputs, to the operation unit 205, image data to be displayed thereon. In addition, the operation unit I/F 204 transmits an instruction issued by a user via the operation unit 205 to the CPU 202.

The network I/F 206 is an interface with a local area network (LAN) 207. The network I/F 206 inputs and outputs transmitted data via the LAN 207. The modem 208 controls data transmitted and received via a public communication line (telephone line) 209.

The ROM 212 stores a system boot program and various programs to be read and executed by the CPU 202. The HDD 213 stores an application program and image data. The RIP 218 rasterizes PDL code into a bitmap image.

The device I/F unit 219 is an interface with the scanner (image input device) 220 and the printer (image output device) 221. The device I/F 219 controls the input and output of image data with the scanner 220 and the printer 221.

The scanner image processing unit 222 executes correction, image processing, and editing on input image data. The printer image processing unit 223 executes on-printer correction and resolution conversion processing on image data to be output from the printer 221. The image rotation unit 224 rotates image data.

The image compression/decompression unit 225 compress and decompress image data. More specifically, the image compression/decompression unit 225 compresses multivalued image data into Joint Photographic Experts Group (JPEG) image data and binary image data into Joint Bi-level Image Experts Group (JBIG), Modified Modified Read (MMR), or Modified Huffman (MH) image data. In addition, the image compression/decompression unit 225 decompresses compressed image data during image processing.

A key to be used in encryption and decryption of image data can be input and output via the IC card slot 210. More specifically, to execute encryption and decryption of image data, the user enters an appropriate personal identifier number (PIN) code after inserting an IC card medium in the IC card slot 210.

The encryption/decryption processing unit 216 is a hardware accelerator board for executing data encryption/decryption processing by using the key inserted in the IC card slot 210.

The apparatus 105 has the configuration described above with reference to FIG. 2. Each of the apparatus 106 and the apparatus 107 has a configuration similar to that of the apparatus 105 except that the apparatus 106 does not include the IC card slot 210 and the encryption/decryption processing unit 216 while the apparatus 107 does not include the printer 221.

Figure 3:
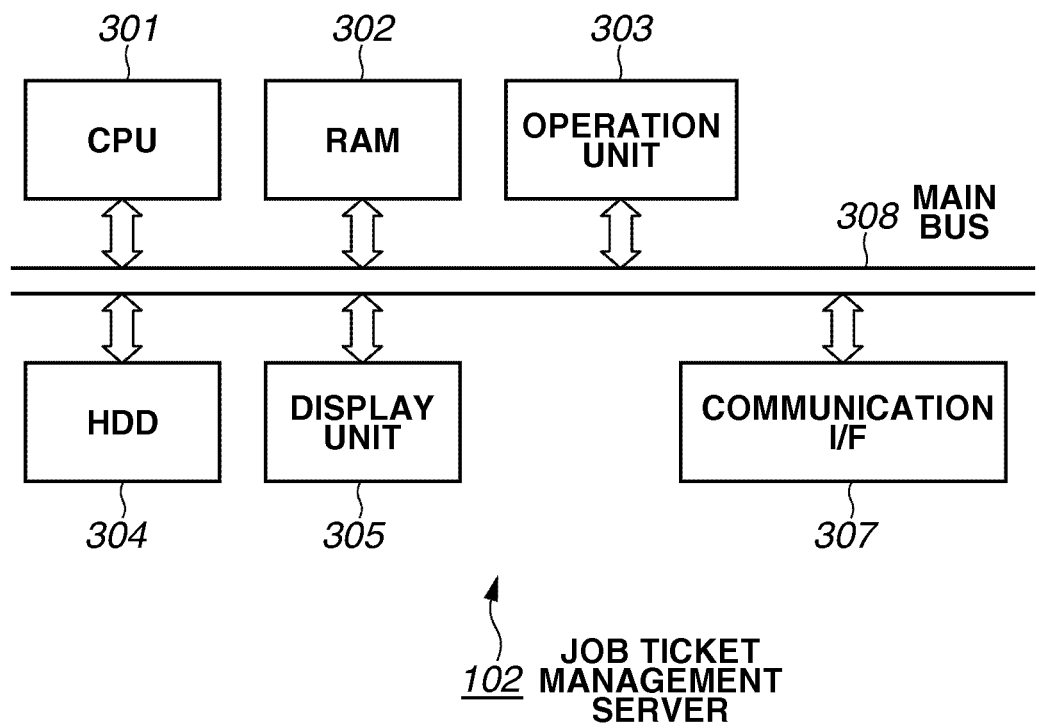
FIG. 3 illustrates an exemplary configuration of a job ticket management server according to an exemplary embodiment of the present invention.

FIG. 3 illustrates an exemplary configuration of the job ticket management server 102 according to the present exemplary embodiment. Referring to FIG. 3, the job ticket management server 102 includes a CPU 301, a RAM 302, an operation unit 303, an HDD 304, a display unit 305, and a communication I/F 307, which are in communication with one another via a main bus 308.

The CPU 301 controls the entire operation of the job ticket management server 102. The RAM 302 stores a program read by the CPU 301. The operation unit 303 includes an input device and a pointing device, such as a keyboard or a mouse. The user can input an operation via the operation unit 303.

The HDD 304 stores a job ticket. A non-volatile memory, such as a non-volatile random access memory (NVRAM), can be used as the HDD 304. The display unit 305 includes a liquid crystal display (LCD), for example, and displays various screens. The communication I/F 307 is used in executing data communication with other apparatuses on the network.

Figure 4:
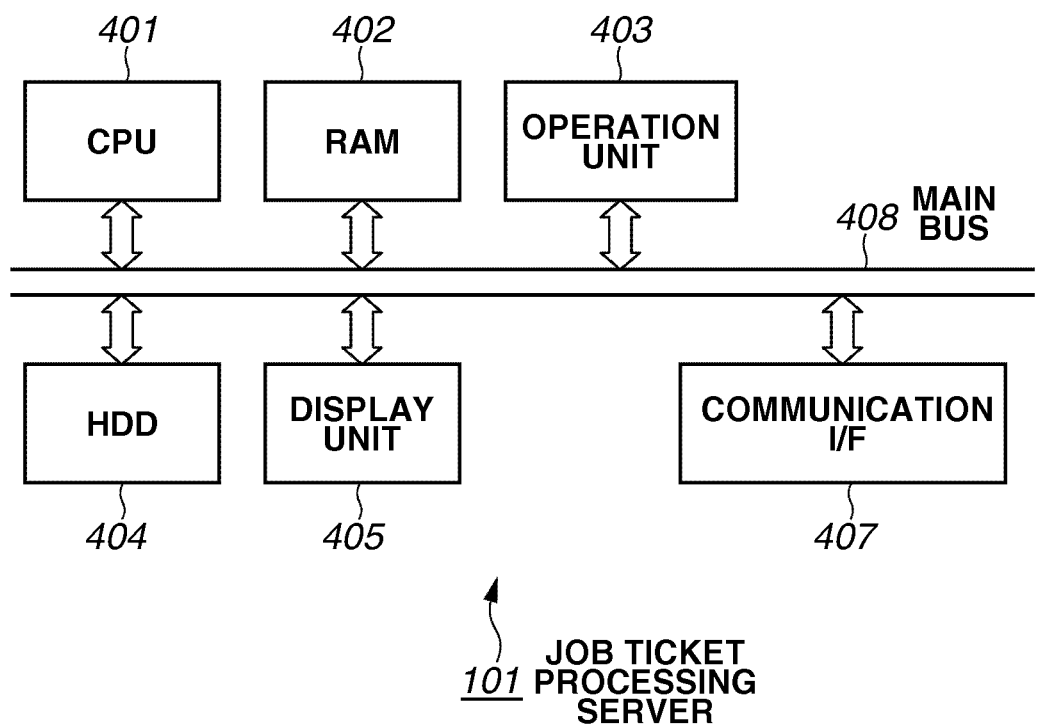
FIG. 4 illustrates an exemplary configuration of a job ticket processing server according to an exemplary embodiment of the present invention.

FIG. 4 illustrates an exemplary configuration of the job ticket processing server 101. Referring to FIG. 4, the job ticket processing server 101 includes a CPU 401, a RAM 402, an operation unit 403, an HDD 404, a display unit 405, and a communication I/F 407, which are in communication with one another via a main bus 408.

The CPU 401 controls the entire operation of the job ticket processing server 101. The RAM 402 stores a program read by the CPU 401. The operation unit 403 includes an input device and a pointing device, such as a keyboard or a mouse. The user can input an operation via the operation unit 403.

The HDD 404 stores a job ticket. A non-volatile memory, such as an NVRAM, can be used as the HDD 404. The display unit 405 includes an LCD, for example, and displays various screens. The communication I/F 407 is used in executing data communication with other apparatuses on the network.

Figure 5:
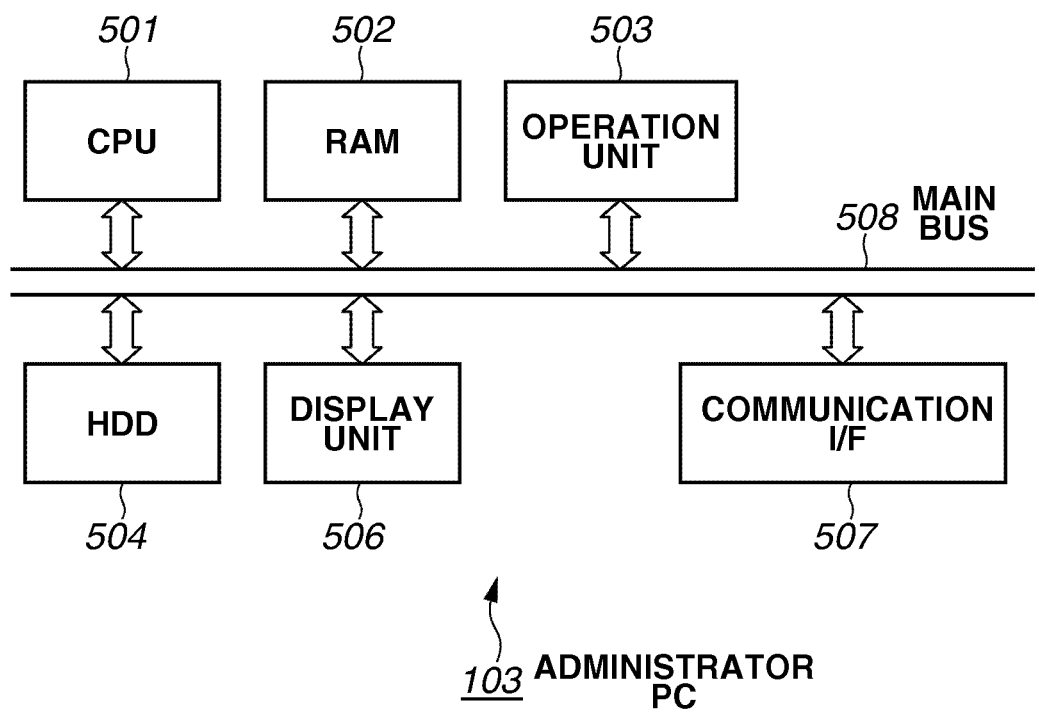
FIG. 5 illustrates an exemplary configuration of an administrator personal computer (PC) according to an exemplary embodiment of the present invention.

FIG. 5 illustrates an exemplary configuration of the administrator PC 103, which is an example of an information processing apparatus according to the present exemplary embodiment capable of generating a job ticket to be presented on the apparatuses 105 through 107.

Referring to FIG. 5, the administrator PC 103 includes a CPU 501, a RAM 502, an operation unit 503, an HDD 504, a display unit 506, and a communication I/F 507, which are in communication with one another via a main bus 508.

The CPU 501 controls the entire operation of the administrator PC 103. The RAM 502 stores a program read by the CPU 501. The operation unit 503 includes an input device and a pointing device, such as a keyboard or a mouse. The user can input an operation via the operation unit 503.

The HDD 504 stores an application program and various settings. A non-volatile memory, such as an NVRAM, can be used as the HDD 504. The display unit 506 includes an LCD, for example, and displays various screens. The communication I/F 507 is used in executing data communication with other apparatuses on the network.

Now, a method will be described in detail below for restricting the use of functions of the apparatus 105 by using a job ticket when the user uses the apparatus 105 in the image processing system according to the present exemplary embodiment having the above-described configuration.

In the present exemplary embodiment, a "job ticket" refers to a file including a definition of a function that a user can use, of functions of the apparatus 105. Furthermore, in the present exemplary embodiment, a job ticket is used in executing processing on the apparatus 105. A job ticket can also be used in executing processing on the apparatuses 106 and 107.

A flow of the processing will be described in detail below with reference to FIG. 6.

Figure 6:
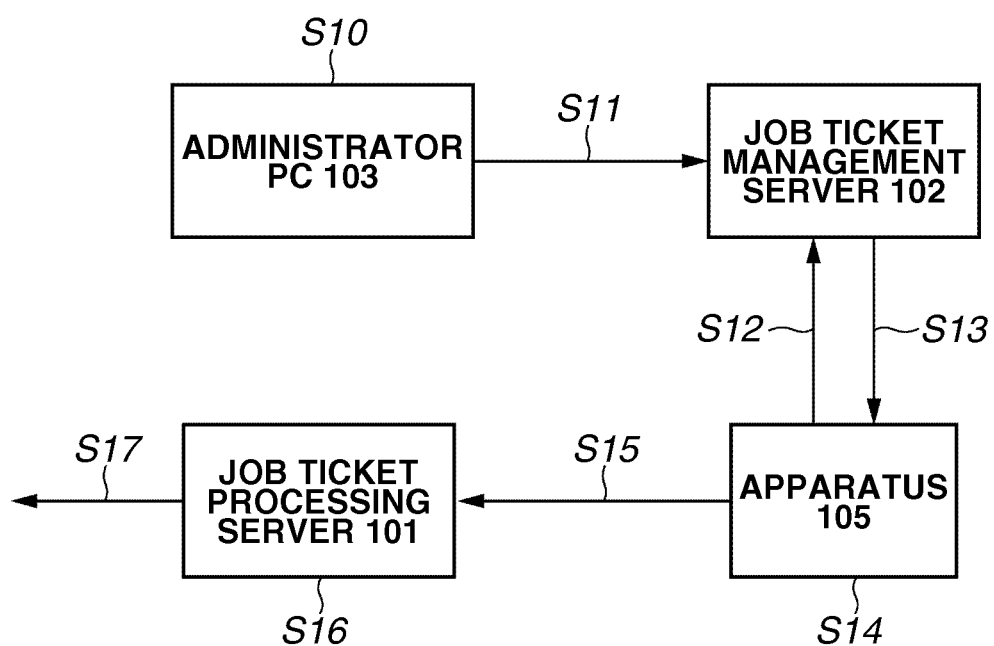
FIG. 6 illustrates an exemplary flow of processing executed by using a job ticket according to an exemplary embodiment of the present invention.

Referring to FIG. 6, in step S10, an administrator of the image processing system generates a job ticket on the administrator PC 103. An application software program for generating and editing a job ticket is previously installed on the administrator PC 103. In generating a job ticket, the administrator activates the application software program.

In step S11, the administrator, by using the activated application software program, generates a job ticket and registers the generated job ticket on the job ticket management server 102. At this time, the job ticket management server 102 associates the job ticket with a user identification (ID) for uniquely identifying a user and registers the job ticket in association with the user ID.

In step S12, the user of the apparatus 105, in using the apparatus 105, enters a user ID and a password to log into the apparatus 105. Then, the user activates a web browser installed on the apparatus 105. In addition, the user of the apparatus 105 enters an address of the job ticket management server 102 to access the job ticket management server 102.

At this timing, the apparatus 105 transmits the user ID, which has been entered by the user during login processing, to the job ticket management server 102.

After receiving the user ID from the apparatus 105, the job ticket management server 102 identifies the user by using the user ID. Furthermore, the job ticket management server 102 transmits the job ticket, which is managed in the job ticket management server 102 in association with the user, to the apparatus 105.

After receiving the job ticket from the job ticket management server 102, the apparatus 105 displays a list of job tickets on the operation unit 205 of the apparatus 105.

The user selects a desired job ticket from among the job tickets displayed as a list. The apparatus 105 executes control related to processing for reading a document by the scanner 220 and transmission of image data of the read document to the network I/F 206 according to a parameter included in the job ticket selected by the user.

If a job ticket includes a description about the image format and a description about the reading resolution, the apparatus 105 executes control for reading the document with the reading resolution described in the job ticket. Furthermore, the apparatus 105 converts the format of the image data of the read document into the image format defined in the job ticket and stores the converted image data on the HDD 213.

In step S15, the apparatus 105 transmits the image data and the job ticket stored on the HDD 213 to the job ticket processing server 101.

In step S16, the job ticket processing server 101 processes the image data of the document received from the apparatus 105 according to the content of the job ticket received from the apparatus 105. If the job ticket includes a definition for executing transmission of the image data to a transmission destination A by e-mail, then in step S17, the job ticket processing server 101 attaches the received image data to an e-mail, and transmits the same to the destination address A.

Neither the apparatus 105 nor the job ticket processing server 101 accepts a user instruction on a parameter not defined in the job ticket. More specifically, both the apparatus 105 and the job ticket processing server 101 execute processing according to the parameters defined in the job ticket only.

By executing control according to the definition included in a job ticket only as described above, the present exemplary embodiment can restrict the content of the processing executed by the apparatus 105 according to the definition included in the job ticket and execute the processing by the apparatus 105 whose content is restricted.

Now, an exemplary flow of processing in controlling the use of extended functions of the apparatus 105 will be described in detail below with reference to flow charts illustrated in the drawings.

To begin with, an exemplary flow of processing executed by the administrator PC 103 will be described in detail below with reference to FIG. 7. Processing in each step illustrated in the flow chart of FIG. 7 is executed by the CPU 501 of the administrator PC 103 by reading and executing a program from a ROM.

When the administrator activates the application for generating a job ticket, the CPU 501 starts the processing illustrated in FIG. 7.

In step S601, the CPU 501 searches for an apparatus connected to the network 4. In step S602, the CPU 501 displays a screen for displaying extracted apparatuses. The administrator selects an apparatus from among those displayed on the screen.

In step S603, the CPU 501 transmits a request for function information of the selected apparatus via the network 4. Furthermore, the CPU 501 receives the function information about the apparatus as a reply to the request.

In step S604, the CPU 501 displays a setting screen for executing a setting of a job ticket on the display unit 506 based on the received function information of the selected apparatus. FIG. 8 illustrates an example of the setting screen.

In step S605, the CPU 501 receives a setting of a parameter set by the administrator via the setting screen illustrated in FIG. 8.

Now, a parameter according to the present exemplary embodiment will be described in detail below. In the present exemplary embodiment, two kinds of parameters are used.

One parameter is common function information, which is information about functions of the apparatus regardless of the manufacturer or model type thereof. The common function information includes the type of the image format that the apparatus complies with and the reading resolution, for example. In addition, the common function information according to the present exemplary embodiment includes a transmission destination of data related to processing by the job ticket processing server 101 and the method for transmitting the data.

The other parameter is extended function information about functions uniquely provided to the apparatus depending on the manufacturer or the model type thereof. The extended function information includes information about whether the color reading mode is available, whether an image scaling function is available, presence or absence of an auto document feeder (ADF), information about the PDF encryption function, an OCR function, or signed PDF file generation function.

The PDF encryption function refers to a function for converting image data of the document read by using the scanner 220 into a PDF file protected by a password. The OCR function refers to a function for recognizing characters or text included in image data of the document read by the scanner 220 and adding the recognized characters or text to the image data of the read document as character information. Furthermore, the signed PDF file generation function is a function for converting the image data of the document read by the scanner 220 into PDF image data and assigning the converted PDF image data with an electronic signature of a user.

The administrator sets a value for each parameter via the screen illustrated in FIG. 8. The administrator can select each parameter by selecting a check box or a radio button displayed on the screen illustrated in FIG. 8. When a parameter is selected by the administrator, the check box or a radio button corresponding to the selected parameter is displayed with a check mark on.

Referring to FIG. 8, a function information column 701 includes items that the administrator can set according to the function of the apparatus 105. A parameter column 702 includes parameters that can be set for each function information. A "permission for changing parameter on apparatus" column 703 includes a value for setting whether to enable changing of a parameter set on the administrator PC 103 via the operation unit 205 of the apparatus 105.

An image format setting item 704 is an item for executing a setting of an image format. More specifically, the image format setting item 704 stores a parameter value indicating into which format image data of the document read by the scanner 220 is to be converted to be stored on the HDD 213. Parameters "JPEG", "RAW", "Tag Image File Format (TIFF)", and "bitmap (BMP)" are displayed as parameters that can be set for the image format.

A reading resolution setting item 705 is an item for setting the reading resolution in reading an image of a document by using the scanner image processing unit 222 of the apparatus 105. The reading resolution setting item 705 includes an X-direction (main scanning direction) reading resolution setting item and a Y-direction (sub scanning direction) reading resolution setting item.

In the example illustrated in FIG. 8, parameters "100 dots per inch (dpi)", "200 dpi", "300 dpi", "400 dpi", "600 dpi", and "1,200 dpi are displayed as parameters that can be set for the X-direction reading resolution and the Y-direction reading resolution of the reading resolution setting item 705.

A data transmission method setting item 706 includes a parameter for a transmission method used in transmitting the image data read by the scanner 220 of the apparatus 105. Parameters "E-mail", "file transfer protocol (FTP)", and "FAX" are displayed as parameters that can be set as the data transmission method.

A data transmission destination setting item 707 includes a parameter for a transmission destination to which the image data read by the scanner 220 of the apparatus 105. The administrator enters a data transmission destination by using an input device such as a keyboard. It is also useful, if the parameter "E-mail" is selected as the data transmission method setting item 706, if data whose format is not an e-mail address cannot be input.

The administrator PC 103 receives the setting of the common function information set by the administrator via the common function information setting screen described above. The above-described setting is defined, in a template for generating a job ticket on the administrator PC 103, which is stored on the HDD 504, as the common function information.

The CPU 501 of the administrator PC 103 displays the setting item defined in the template, of the function information received from the apparatus 105, as the common function information.

An exemplary screen for receiving a setting related to extended function information will be described in detail below.

The apparatus 105 includes an extended function, such as a color reading function, a scaling function, an ADF function, the PDF encryption function, an OCR function, and the signed PDF file generation function.

The screen for setting the extended function information illustrated in FIG. 8 is displayed under control of the CPU 501 of the administrator PC 103 after interpreting the function information not defined in the template, of the function information received from the apparatus 105.

A document color reading mode setting item 711 includes a parameter for the color mode of reading an image of the document by using the scanner image processing unit 222 of the apparatus 105. More specifically, the document color reading mode setting item 711 is a setting item for setting whether to read a document image as monochromatic data or color data.

The document color reading mode setting item 711 includes parameters "monochromatic" and "red (R), green (G), and blue (B) (RGB) 24". If a check box corresponding to the parameter "RGB24", the apparatus 105 executes control for reading an image of a document by a 24-bit gradation.

In the present exemplary embodiment, the apparatus 105 complies with the RGB24 reading mode (the reading mode for reading an image by the 24-bit gradation). However, the present exemplary embodiment is not limited to this. More specifically, it is also useful if an image reading mode such as RGB16 (a reading mode for reading an image by a 16-bit gradation) is used. In other words, the parameter value that can be set may change according to the capacity of the apparatus.

A scaling setting item 712 is an item for setting whether to use a function for scaling the size of a read document image in reading an image of a document by using the scanner image processing unit 222 of the apparatus 105.

An ADF setting item 713 is an item for setting whether to use an ADF, which automatically feeds at least one sheet of document to be scanned to the scanner 220. An encrypted PDF setting item 714 is an item for setting whether to convert the read document image into a PDF file, to encrypt the PDF file, and to transmit the encrypted PDF file.

An OCR setting item 715 is an item for setting whether to execute OCR processing during document reading processing on the apparatus 105. A signed PDF file setting item 716 is an item for setting whether to convert an image of a document read by the scanner image processing unit 222 of the apparatus 105 into a signed PDF file.

The administrator can perform the above-described setting of the extended function information on the apparatus 105 by either one of the following three methods (1) through (3):

(1) Manually Set the Extended Function Information. If a check box 708 is checked, the administrator manually sets parameter values for each of the extended function information setting items 711 through 716 via the operation unit 503. In the example illustrated in FIG. 8, the check box 708 is checked and thus each setting item is manually set.

(2) Evenly/Uniformly Permit Use of the Extended Function.

If a check box 709 is checked and if a "generate job ticket" key 720 is pressed in this state, the CPU 501 of the administrator PC 103 executes control for generating a job ticket including information indicating that the use of the extended function is uniformly permitted. In this case, if a parameter is set for each of the setting items 711 through 716, no value thereof is included in the job ticket.

(3) Inhibit Use of the Extended Function.

If a check box 710 is checked and if the "generate job ticket" key 720 is pressed in this state, the CPU 501 of the administrator PC 103 executes control for generating a job ticket including information indicating that the use of the extended function is uniformly inhibited. In this case, if a parameter is set for each of the setting items 711 through 716, no value thereof is included in the job ticket.

As described above, if the setting of each setting item is executed and if the "generate job ticket" key 720 is pressed in this case, the administrator PC 103 executes control for generating a job ticket according to the set setting item.

Returning to FIG. 7, if the "generate job ticket" key 720 is pressed, then in step S606, the CPU 501 determines whether the administrator has issued an instruction for generating a job ticket. If it is determined that the generation of a job ticket has been instructed (YES in step S606), then the processing advances to step S607.

In step S607 and subsequent steps, the CPU 501 executes the following processing to generate a job ticket.

In step S607, the CPU 501 sets a parameter for the common function information, of the parameters received in step S605, on the job ticket. In step S608, the CPU 501 determines whether a setting item related to the extended function information is included in the screen illustrated in FIG. 8.

If it is determined that no setting item related to the extended function information is included in the screen illustrated in FIG. 8 (NO in step S608), then the processing advances to step S614. In step S614, the CPU 501 registers the job ticket including the setting of the common function information on the job ticket management server 102. Then, the processing ends.

FIG. 16 illustrates an example of a job ticket registered in this case.

Referring to FIG. 16, a description 2001 includes descriptions "Process id", "Creator", and "Caption". The description "Process id" includes an identification (ID) for uniquely identifying the job ticket. The description "Creator" describes a creator of the job ticket (the network address of the job ticket creating apparatus). The description "Caption" indicates the name of the job ticket.

A description 2002 describes the name of the setting item. In the example illustrated in FIG. 16, the setting of the image format ("Setting type") has a parameter value "format". A description 2003 includes descriptions for a parameter, such as the format of the image data and the transmission method.

After receiving the job ticket, the apparatus 105 executes processing according to the parameter defined in the description 2003 related to the setting item defined in the description 2002.

Descriptions 2004 and 2005 each describe settings of other setting items. If a parameter "changeable has a value "1", the setting item can be changed via the operation unit 205 of the apparatus 105.

On the other hand, if it is determined that a setting item related to the extended function information is included in the screen illustrated in FIG. 8 (YES in step S608), then the processing advances to step S609.

In step S609, the CPU 501 determines whether the setting of the extended function information has been manually executed. If it is determined that the setting of the extended function information has been manually executed (YES in step S609), then the processing advances to step S610.

In step S610, the CPU 501 adds the parameter of the extended function that has been manually set to the job ticket.

FIG. 17 illustrates an example of a job ticket added to the job ticket in step S610 according to the present exemplary embodiment.

The job ticket illustrated in FIG. 17 includes an extended function information setting 2006 in addition to the common function information setting illustrated in FIG. 16.

In step S614, the CPU 501 transmits the generated job ticket to the job ticket management server 102 and registers the job ticket thereon. Then, the processing ends.

On the other hand, if it is determined that the setting of the extended function information has not been manually set in the generated job ticket (NO in step S609), then the processing advances to step S611.

In step S611, the CPU 501 determines whether the uniform permission of use of the extended functions has been set by checking the check box 709. If it is determined that the uniform permission of use of the extended functions has been set by checking the check box 709 (YES in step S611), then the processing advances to step S612. In step S612, the CPU 501 adds a flag indicating the uniform permission of use of the extended functions to the job ticket.

FIG. 18 illustrates an example of a job ticket including the above-described flag. Referring to FIG. 18, a flag 2007 is a flag for inhibiting the use of the extended function.

Returning to FIG. 7, in step S611, the CPU 501 determines whether the check box 710 has been checked. If it is determined that the check box 710 has been checked and thus the use of the extended function has been inhibited (NO in step S611), then the processing advances to step S613.

In step S613, the CPU 501 adds a flag that inhibits the use of the extended function, to the job ticket.

FIG. 19 illustrates an example of the job ticket to which the flag that inhibits the use of the extended function is added. Referring to FIG. 19, a flag 2008 is a flag that inhibits the use of the extended function.

Returning to FIG. 7, in step S614, the CPU 501 registers the generated job ticket on the job ticket management server 102. After executing the above-described processing, the processing for generating a job ticket and the registration of the job ticket on the job ticket management server 102 by the administrator PC 103 ends.

Figure 9:
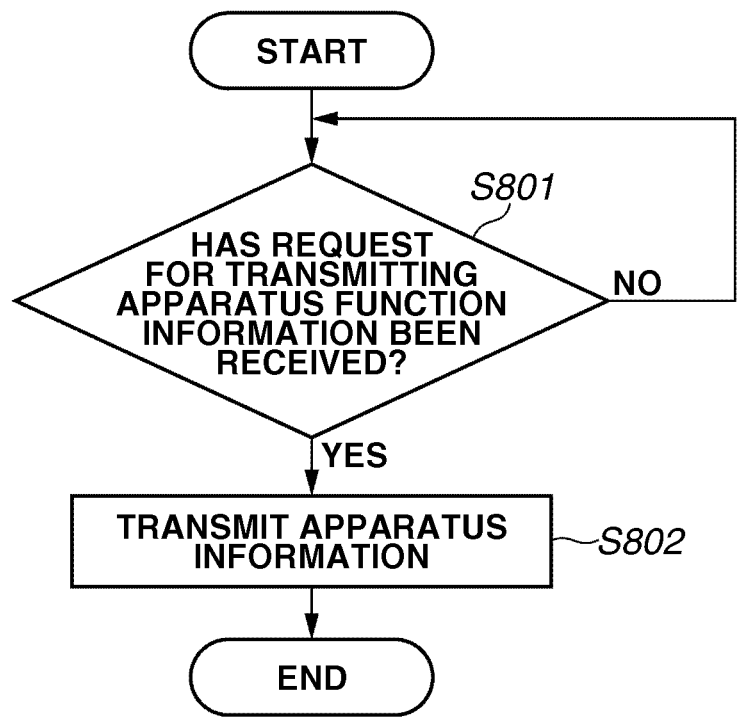
FIG. 9 is a flow chart illustrating exemplary flow of control processing executed by the apparatus according to an exemplary embodiment of the present invention.

FIG. 9 illustrates exemplary processing executed by the apparatus 105 when the administrator PC 103 has received a notification in step S603 (FIG. 6). Processing in each step illustrated in the flow chart of FIG. 9 is executed by the CPU 202 of the apparatus 105 by reading and executing a program from the ROM 212.

Referring to FIG. 9, in step S801, the CPU 202 determines whether a request for function information about the apparatus 105 has been received from the administrator PC 103. If it is determined that a request for function information about the apparatus 105 has been received (YES in step S801), then the processing advances to step S802.

In step S802, the CPU 202 transmits the function information about the apparatus 105, which is previously stored on the HDD 213, to the administrator PC 103. In step S603 (FIG. 7), the administrator PC 103 receives the function information transmitted from the apparatus 105.

Now, a flow of control for receiving a job ticket on the apparatus 105 and executing processing according to the received job ticket will be described in detail below with reference to FIG. 10.

Figure 10:
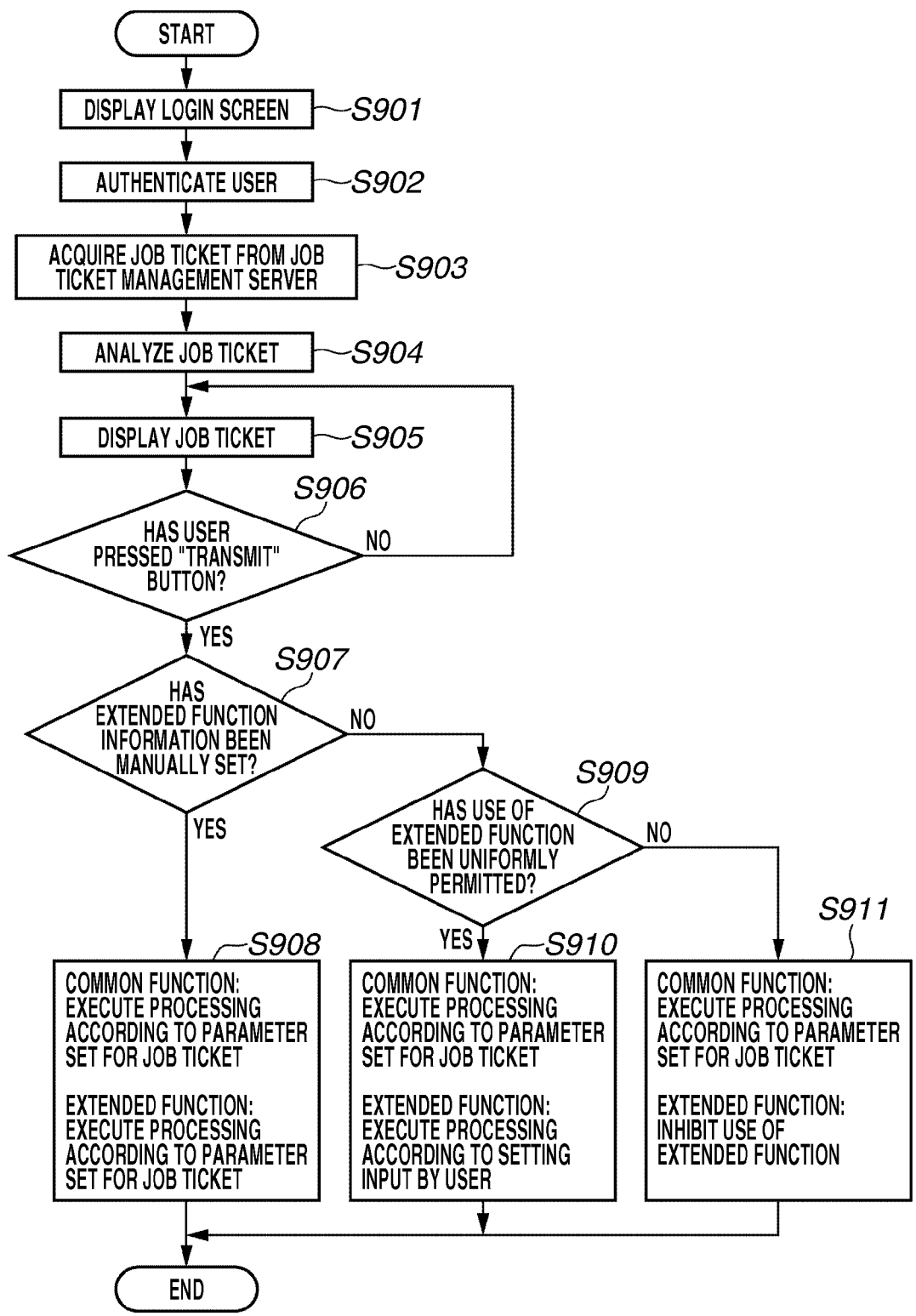
FIG. 10 is a flow chart illustrating exemplary flow of control processing executed by the apparatus according to an exemplary embodiment of the present invention.
Figure 11:
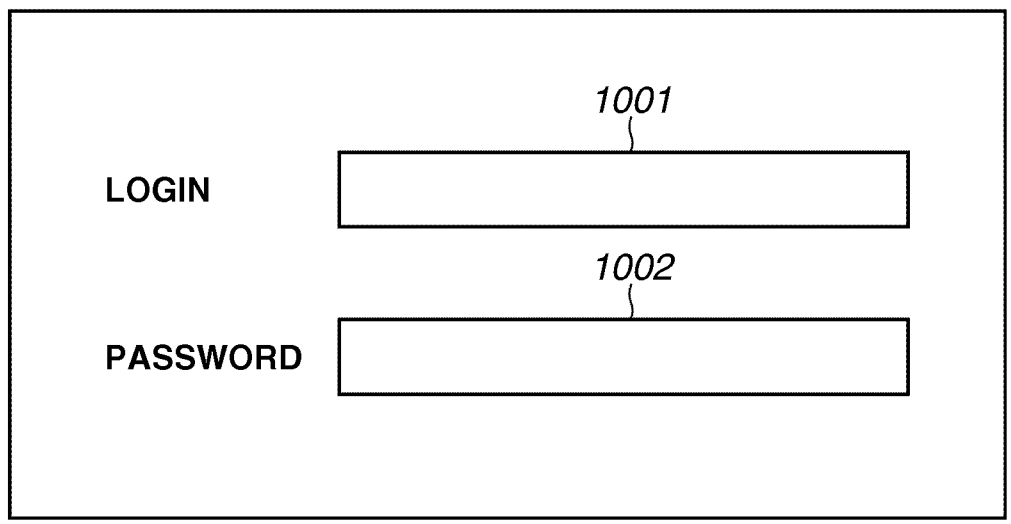
FIG. 11 illustrates an example of a display screen displayed on the apparatus according to an exemplary embodiment of the present invention.

Referring to FIG. 10, in step S901, the CPU 202 displays a login screen illustrated in FIG. 11 on the operation unit 205 and waits until the user enters the user ID and the password. In the example illustrated in FIG. 11, the user can enter the user ID into an input area 1001. Furthermore, the user can enter the password into an input area 1002.

However, the present exemplary embodiment is not limited to this. More specifically, it is also useful if the user enters the user ID and the password by the following method. More specifically, the user can insert an IC card medium into the IC card slot 210. In this case, the user ID and the password of the user stored on the IC card medium are read.

Returning to FIG. 10, in step S902, the CPU 202 executes user authentication processing based on the user ID and the password input by the user. If the user is normally authenticated, then the processing advances to step S903.

In step S903, the CPU 202 transmits a request for a job ticket to the job ticket management server 102. Furthermore, the CPU 202 transmits the user ID of the authenticated user to the job ticket management server 102.

After receiving the request from the job ticket management server 102, the job ticket management server 102 transmits, to the apparatus 105, the job ticket registered thereon in association with the user ID received together with the request for the job ticket.

After receiving the job ticket from the job ticket management server 102, the CPU 202 of the apparatus 105 stores the received job ticket on the HDD 213.

In step S904, the CPU 202 analyzes the job tickets stored on the HDD 213. The CPU 202 executes processing in step S905 and beyond according to a result of the analysis.

Figure 12:
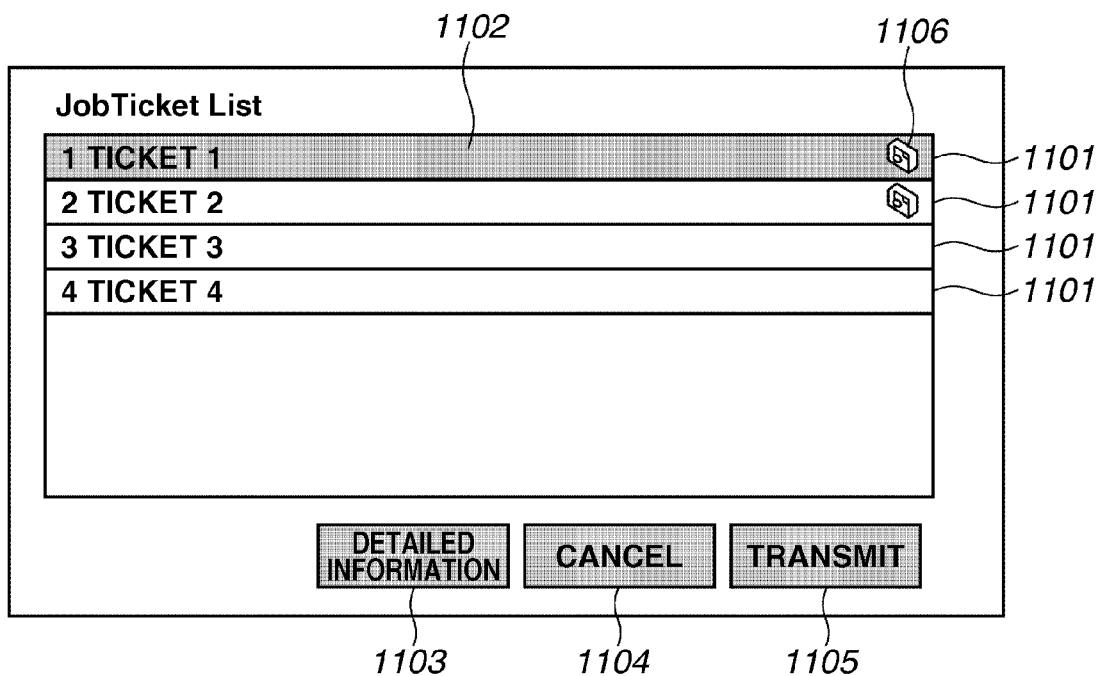
FIG. 12 illustrates an example of a display screen displayed on the apparatus according to an exemplary embodiment of the present invention.

In step S905, the CPU 202 displays the job tickets stored on the HDD 213 on the operation unit 205. FIG. 12 illustrates an example of a screen of the operation unit 205 displaying the job ticket.

Referring to FIG. 12, a job ticket 1101 includes an extended function icon 1106. If the job ticket 1101 includes the extended function icon 1106, the job ticket 1101 includes the extended function as the setting included in the job ticket 1101.

A "detailed setting" button 1103 can be operated to issue an instruction for displaying the details of the function information included in the job ticket as illustrated in FIG. 13. The example illustrated in FIG. 13 will be described in detail below.

A "cancel" button 1104 can be operated to issue an instruction for discontinuing the display of the screen illustrated in FIG. 12. A "transmit" button 1105 can be operated to issue an instruction for executing the processing according to the parameter included in the job ticket selected on the screen illustrated in FIG. 12.

More specifically, when the "transmit" button 1105 is pressed, the CPU 202 reads an image of a document set on the scanner 220 with the reading resolution defined in the job ticket. In addition, the CPU 202 executes control for converting the read document image into an image format defined in the job ticket. Furthermore, the CPU 202 transmits the converted image data and the job ticket to the job ticket processing server 101.

Returning to FIG. 10, in step S906, the CPU 202 determines whether a job ticket has been selected via the operation unit 205 and the "transmit" button 1105 has been pressed by the user. If it is determined that the "transmit" button 1105 has not been pressed (NO in step S906), then the processing returns to step S905 and repeats the processing in step S905. On the other hand, if it is determined that the "transmit" button 1105 has been pressed (YES in step S906), then the processing advances to step S907.

In step S907, the CPU 202 determines whether the extended function information has been manually set. If it is determined that the extended function information has been manually set (YES in step S907), then the processing advances to step S908.

In step S908, the CPU 202 executes the processing according to the common function information and the extended function information set in the job ticket.

If a plurality of pieces of extended function information is included in the job ticket, then the CPU 202 determines whether the use of each extended function information has been permitted. If it is determined that the use of any extended function information has been permitted, then the CPU 202 identifies the parameter to be used and executes control so that the processing is to be executed according to a result of the identified parameter.

On the other hand, if it is determined that the extended function information has not been manually set (NO in step S907), then the processing advances to step S909.

In step S909, the CPU 202 determines whether a description for uniformly permitting the use of the extended functions is included in the job ticket by referring to an "extend permitted" flag included in the job ticket. If it is determined that the use of the extended functions is uniformly permitted (YES in step S909), then the processing advances to step S910.

In step S910, the CPU 202 executes the processing according to the set parameter with respect to the common function information. On the other hand, the CPU 202 executes the processing according to the setting set by the user with respect to the extended function information.

The user can execute the setting of the extended function information via a screen illustrated in FIG. 13.

If a description of the extended function of the apparatus 105 is not included in the job ticket and if the user presses the "detailed information" button 1103 illustrated in FIG. 12, then the CPU 202 identifies the extended function included in the apparatus 105.

In addition, the CPU 202 displays a screen for setting both the identified extended function and the common function on the operation unit 205. It is also useful, when the user does not display the screen illustrated in FIG. 13 and presses the "transmit" button 1105 without having executed the setting of the extended function information in step S910, if the CPU 202 automatically displays the screen illustrated in FIG. 13. With this configuration, the present exemplary embodiment can prevent the user from failing to set the extended function information.

On the other hand, if it is determined that the use of the extended functions is not uniformly permitted (NO in step S909), then the processing advances to step S911.

In step S911, the CPU 202 executes the processing according to the set parameters with respect to the common function information. On the other hand, the CPU 202 inhibits the use of the extended functions.

FIG. 13 illustrates an example of a screen used to display details of the function information included in the job ticket according to the present exemplary embodiment.

Referring to FIG. 13, the function information is displayed side by side. If it is permitted to change the defined function information, the user can change the parameter.

In the example illustrated in FIG. 13, the function information displayed on the screen indicates the function information for which changing of parameters is not permitted.

The function information for which the "permission for changing parameter on apparatus" column 703 is checked on the administrator PC 103 can be changed by the user. The function information whose "permission for changing parameter on apparatus" column 703 is not checked or cannot be checked as default setting cannot be changed by the user.

The parameter that can be changed by the user can be changed by the user by changing the parameter by selecting from a pull-down menu 1202 as illustrated in FIG. 13. For the parameter for the transmission destination, if a plurality of transmission destinations is set, a pull-down menu is displayed.

If the user presses a setting button 1204 after changing the changeable parameter, the setting information is finally set. A cancel button 1205 can be operated to issue an instruction for resetting a changed changeable parameter to the original parameter and discontinuing the display of the detailed setting screen.

As described above, in generating a job ticket, the administrator PC 103 acquires the common function information and the extended function information from the apparatus 105 and generates a job ticket according to the acquired information. During this processing, the administrator can set a parameter for the extended function information not included in the template for generating a job ticket.

With this configuration, in executing the processing on the apparatus 105 according to the received job ticket, the user can use the extended function of the apparatus 105.

In the present exemplary embodiment having the above-described configuration, the administrator can set the parameter to uniformly permit or inhibit the use of the extended functions. Accordingly, the administrator can easily generate a job ticket if the apparatus has a large number of extended functions.

Now, a second exemplary embodiment of the present invention will be described in detail below. In the above-described first exemplary embodiment, the administrator PC 103 acquires the information about the extended functions of the apparatus 105 and the administrator can edit the parameters for the acquired extended function information on the administrator PC 103.

However, the administrator PC 103 may not always acquire the extended function information about the apparatus 105. Furthermore, the administrator PC 103 may not interpret the extended function of the apparatus 105 even when the extended function information about the apparatus 105 has been acquired. In this case, the administrator can set the parameter for the common function information only.

In this case, the job ticket cannot include the parameter for the extended function information. Accordingly, the user may not utilize the extended function of the apparatus 105. Thus, the convenience of the user may degrade.

In the present exemplary embodiment, a method will be described in detail below for preventing the possible degradation of the convenience of the user that may otherwise arise if the user cannot use the extended function of the apparatus 105 because the administrator PC 103 cannot set the parameter of the extended function information about the apparatus 105.

An image processing system according to the present exemplary embodiment has the configuration substantially similar to that of the above-described first exemplary embodiment. Accordingly, the description thereof will not be repeated here. In the following description, the configuration of the present exemplary embodiment different from that of the first exemplary embodiment will be primarily described.

Figure 14:
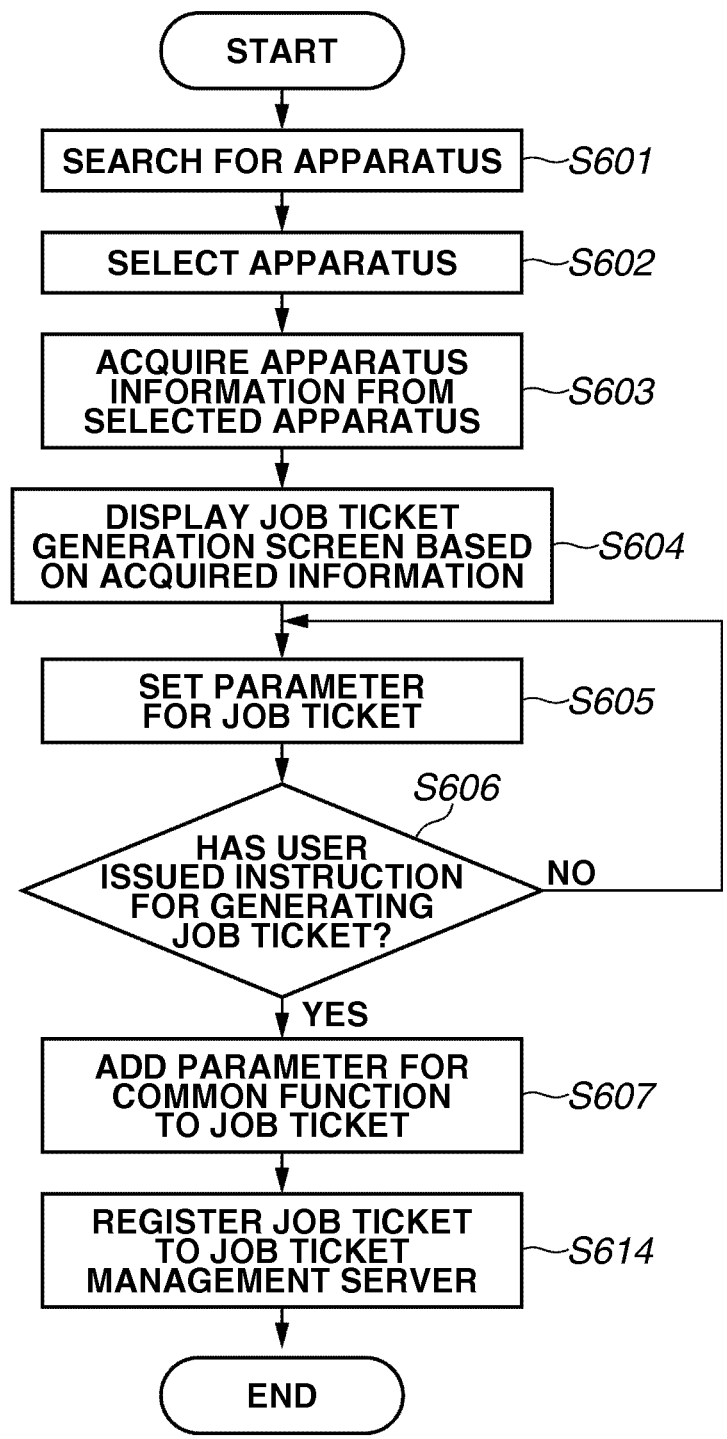
FIG. 14 is a flow chart illustrating exemplary flow of control processing executed by the administrator PC according to an exemplary embodiment of the present invention.

FIG. 14 is a flow chart illustrating exemplary flow of control processing executed by the administrator PC 103 according to the present exemplary embodiment. In the example illustrated in FIG. 14, the processing similar to that described above with reference to FIG. 7 is provided with the same reference numeral. Accordingly, the description thereof will not be repeated here.

Different from the first exemplary embodiment, in the present exemplary embodiment, the administrator PC 103 cannot set the extended function information about the apparatus 105 due to the following causes (1) and (2):

(1) The CPU 501 of the administrator PC 103 can acquire the common function information about the apparatus 105 but cannot acquire the extended function information about the apparatus 105 in step S603 (FIG. 7).

(2) The CPU 501 of the administrator PC 103 can acquire the extended function information about the apparatus 105 in step S603 (FIG. 7) but cannot interpret the acquired extended function information. Accordingly, the CPU 501 of the administrator PC 103 cannot display the screen illustrated in FIG. 8 for receiving the setting of the extended function information.

Accordingly, the administrator PC 103 sets the parameter of the common function information in step S607 (FIG. 7) but does not set the parameter of the extended function information.

In addition, the CPU 501 of the administrator PC 103 registers the job ticket including the setting of the common function information only on the job ticket management server 102.

By executing the above-described processing, the generation and registration of the job ticket are completed.

Figure 15:
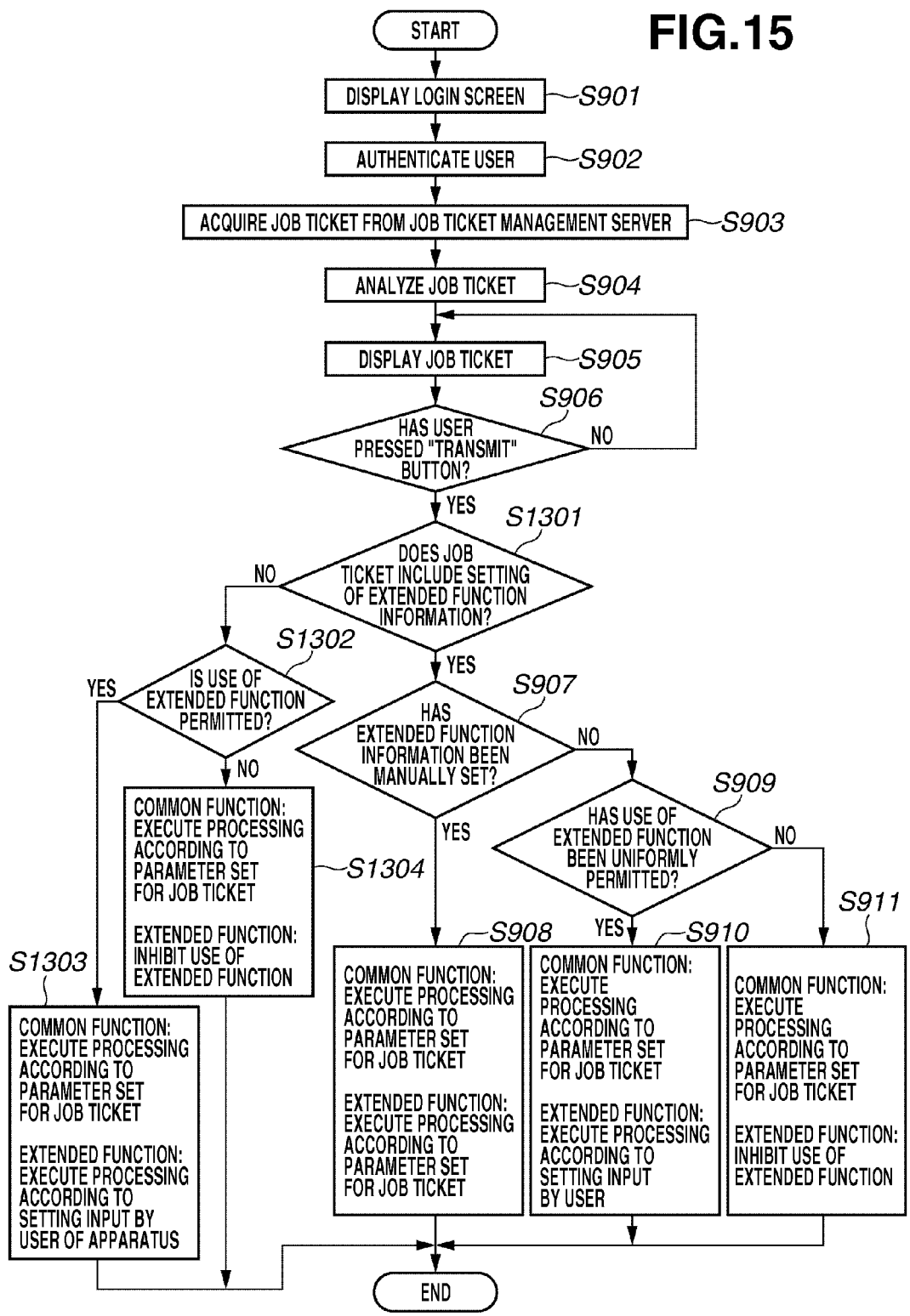
FIG. 15 is a flow chart illustrating exemplary flow of control processing executed by the apparatus according to an exemplary embodiment of the present invention.

FIG. 15 is a flow chart illustrating exemplary flow of control processing executed by the apparatus 105 according to the present exemplary embodiment. The processing illustrated in FIG. 15 is substantially similar to that of the first exemplary embodiment illustrated in FIG. 10 except the processing in steps S1301 and S1302.

If the user presses the "transmit" button 1105 while a job ticket is currently selected in step S906, then the processing advances to step S1301.

In step S1301, the CPU 202 of the apparatus 105 determines whether the job ticket includes the setting of the extended function information. If it is determined that the job ticket does not include a setting of the extended function information (NO in step S1301), then the processing advances to step S1302.

In step S1302, the CPU 202 determines whether the setting has been set so that the use of the extended function is to be permitted if the setting of the extended function information is not included in the job ticket.

If it is determined that the setting has been set so that the use of the extended function is to be permitted (YES in step S1302), then the processing advances to step S1303. On the other hand, if it is determined that the setting has been set so that the use of the extended function is to be inhibited (NO in step S1302), then the processing advances to step S1304.

In step S1303, the CPU 202 executes the processing with respect to the common function according to the parameter set in the job ticket. If the apparatus 105 has the extended function not set in the job ticket, the CPU 202 executes the processing with respect to the extended function information not set in the job ticket according to the setting set by the user on the apparatus 105.

The user can execute the setting of the extended function information via the screen illustrated in FIG. 13.

If the job ticket does not include a description of the extended function of the apparatus 105 and if the user presses the "detailed information" button 1103 (FIG. 12), then the CPU 202 executes processing for identifying the extended function of the apparatus 105.

Furthermore, the CPU 202 displays a screen for setting both the identified extended function and the common function on the operation unit 205.

It is also useful, if the user has neither displayed the screen illustrated in FIG. 13 nor set the extended function information and if the user has pressed the "transmit" button 1105 in this state, if the CPU 202 automatically displays the screen illustrated in FIG. 13.

With the above-described configuration, the present exemplary embodiment can prevent the user from failing to set the extended function information.

In step S1304, the CPU 202 executes the processing according to the common function information included in the job ticket with respect to the common function. With respect to the extended function, the CPU 202 inhibits the use thereof.

By executing the above-described control, if the administrator PC 103 cannot set the parameter for the extended function information about the apparatus 105, the present exemplary embodiment can prevent the possible degradation of the convenience of the user that may otherwise arise if the user cannot use the extended function of the apparatus 105.

If the administrator intends to inhibit the extended functions not defined in the job ticket, the administrator can execute the setting of the apparatus 105 so that the use of the extended functions of the apparatus 105 is inhibited. With this configuration, the present exemplary embodiment can inhibit the use of the extended function by the user.

It is also useful, in setting whether to permit the use of the extended function of the apparatus 105 as the setting of the apparatus 105, if the user is required to enter a password. In this case, if an appropriate password is entered, the apparatus 105 displays a setting screen for receiving a setting as to whether to permit the use of the extended function. Furthermore, if the user does not enter an appropriate password, the apparatus 105 does not display the display screen.

With this configuration, the present exemplary embodiment can restrictedly set the permission of the use of the extended functions of the apparatus 105 to a specific user (the administrator, for example) who knows the appropriate password.

In the present exemplary embodiment, as the setting of the apparatus 105, whether to permit the extended function of the apparatus 105 is determined according to the setting of the apparatus 105. However, the present exemplary embodiment is not limited to this. In other words, the present invention can be applied to an apparatus that has the following function.

More specifically, the present invention can be implemented if an apparatus of the present invention permits or inhibits the use of the extended function if the setting as to whether to permit the use of the extended function and if the job ticket does not include the setting of the extended function.

In each of the above-described exemplary embodiments of the present invention, if the job ticket is manually set, values of all the extended functions are always set and a job ticket including the setting of all the values is generated. However, the present exemplary embodiment is not limited to this.

More specifically, it is also useful if a part of the extended functions only is manually set, if the job ticket includes the extended function information of the manually set extended function, and if the administrator PC 103 generates a job ticket that does not include the extended function information of the extended function that has not been manually set.

If the apparatus 105 receives the above-described job ticket, the apparatus 105 can execute the processing of the manually set extended function information according to the content of processing manually set in the job ticket.

If the apparatus 105 includes an extended function other than the manually set extended functions, the apparatus 105 can execute the processing of the extended function according to an instruction received from the user.

With the above-described configuration, if an extended function of the apparatus 105 is added after registering the job ticket on the job ticket management server 102, the present exemplary embodiment can prevent the user from being inhibited from using the added extended function.

In each of the above-described exemplary embodiments, the apparatus 105 downloads the job ticket. However, the present exemplary embodiment is not limited to this. More specifically, the above-described can be implemented if the apparatus 106 or the apparatus 107 downloads the job ticket.

In each of the above-described exemplary embodiments, the job ticket management server 102 associates the job ticket with each user and stores the job ticket in association with the user ID of the user. However, the present exemplary embodiment is not limited to this. More specifically, it is also useful if the job ticket management server 102 associates the job ticket with both the user ID and apparatus identification information for uniquely identifying the apparatus and stores the job ticket in association with both the user ID and the apparatus identification information.

Furthermore, in each of the above-described exemplary embodiments, the administrator PC 103 generates the job ticket. However, the present exemplary embodiment is not limited to this. More specifically, it is also useful if the administrator transmits the template of the job ticket from the administrator PC 103 to the apparatus 105 and the user edits the received job ticket on the apparatus 105.

In this case, the apparatus 105 analyzes the template of the job ticket and displays a screen for receiving the setting of the common function information such as the image format or the reading resolution. In addition, in this case, the user sets the parameter for the common function information included in the received job ticket via the screen.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-281869 filed Oct. 31, 2008, which is hereby incorporated by reference herein in its entirety.

What is claimed is:

1. An image processing apparatus comprising:
a transmitting unit configured to transmit device information of the image processing apparatus to an information processing apparatus, wherein the information processing apparatus generates a job ticket based on the device information transmitted by the transmitting unit;
a receiving unit configured to receive the job ticket generated by the information processing apparatus via a network;
a determination unit configured to determine whether a user who is to use the job ticket received by the receiving unit is a user permitted to use an extended function unable to be defined in the job ticket;
a control unit configured, if it is determined by the determination unit that the user who is to use the job ticket is a user permitted to use the extended function, to permit the user to use the extended function, and configured, if it is determined by the determination unit that the user who is to use the job ticket is a user not permitted to use the extended function, not to permit the user to user the extended function, and
an execution unit configured, if it is determined by the determination unit that a user selecting the job ticket is a user permitted to use the extended function, to execute image processing using a function defined in the job ticket received by the receiving unit and the extended function selected by the user, and configured, if it is determined by the determination unit that the user selecting the job ticket is a user not permitted to use the extended function, to execute image processing using the function defined in the job ticket received by the receiving unit instead of using the extended function.

2. The image processing apparatus according to claim 1, further comprising a setting unit configured to set information as to whether to permit the user to use the extended function as a setting of the image processing apparatus,
wherein the determination unit is configured to determine whether the user who is to use the job ticket received by the receiving unit is a user permitted to use an extended function unable to be defined in the job ticket according to the setting set by the setting unit.

3. The image processing apparatus according to claim 1, wherein the determination unit is configured to determine the user who is to use the job ticket received by the receiving unit is a user permitted to use an extended function unable to be defined in the job ticket according to a setting as to whether the use of the extended function is permitted, which is defined in the job ticket received by the receiving unit.

4. The image processing apparatus according to claim 1, further comprising a reading unit configured to read an image of a document,
wherein the execution unit is configured to execute image processing of the image of the document read by the reading unit according to the job ticket received by the receiving unit.

* * * * *